United States Patent [19]
Wittlinger

[11] 3,925,718
[45] Dec. 9, 1975

[54] CURRENT MIRROR AND DEGENERATIVE AMPLIFIER

[75] Inventor: Harold Allen Wittlinger, Pennington, N.J.

[73] Assignee: RCA Corporation, New York, N.Y.

[22] Filed: Nov. 26, 1974

[21] Appl. No.: 526,259

[52] U.S. Cl. ........................ 323/4; 323/9; 307/297; 330/22; 330/38 M
[51] Int. Cl.$^2$ ........................ G05F 1/56
[58] Field of Search ............ 307/296, 297; 323/1, 4, 323/9; 330/22, 38 M

[56] References Cited

UNITED STATES PATENTS

| | | | |
|---|---|---|---|
| 3,508,081 | 4/1970 | Matsuda | 323/1 |
| 3,588,672 | 6/1971 | Wilson | 323/4 |
| 3,714,600 | 1/1973 | Kuijk et al. | 330/18 X |
| 3,721,893 | 3/1973 | Davis | 307/297 X |
| 3,760,199 | 9/1973 | Graeme | 307/296 |
| 3,775,667 | 11/1973 | Bartos | 323/1 X |
| 3,813,595 | 5/1974 | Sheng | 323/4 |
| 3,843,933 | 10/1974 | Ahmed | 307/297 X |
| B387,171 | 1/1975 | Schade, Jr. | 330/38 M X |

*Primary Examiner*—William M. Shoop
*Attorney, Agent, or Firm*—Harold Christoffersen; Samuel Cohen; Kenneth Watov

[57] ABSTRACT

Improved high-frequency performance is obtained for a bipolar transistorized current mirror, fabricated as an integrated circuit, through the addition of a field-effect transistor(FET). The conduction path of the FET is placed in series with the output current path of the mirror and the gate electrode is coupled to the input terminal of the mirror. The FET maintains increased output current flow to a load as the frequency increases, thereby compensating for the reduction in gain, with frequency, of the bipolar mirror transistors. This same circuit may be operated as a degenerative FET amplifier, with the mirror providing the quiescent bias for the FET and operating as a degenerative source impedance.

24 Claims, 10 Drawing Figures

PRIOR ART PRIOR ART

CURRENT MIRROR AND DEGENERATIVE AMPLIFIER

Figures 1A, 1B:
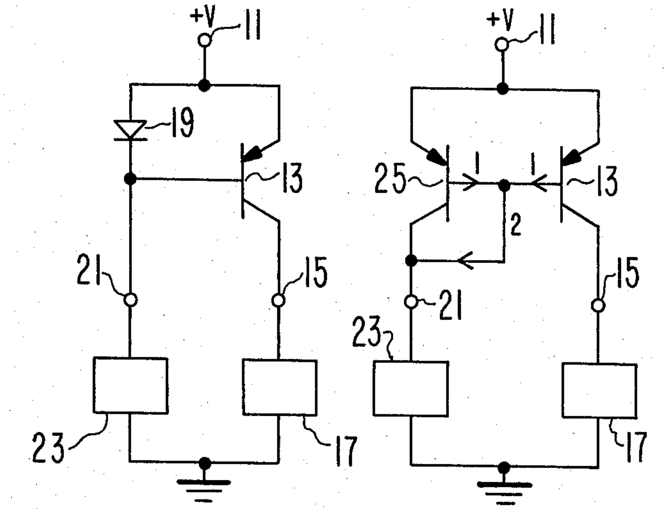

A current mirror is a circuit which produces an output current in one leg of the circuit, in fixed proportion to an input current applied to another leg of the circuit. Current mirrors are used as current sources in differential amplifiers, power supplies, and in other circuits, and have many other applications. Although current mirrors may be fabricated from discrete components, they are most widely made as integrated circuits, because in this technology the matched circuit parameters required for optimum performance, are easily obtained.

A basic current mirror may include a pair of matched bipolar transistors having interconnected base electrodes, and emitter electrodes connected to a common terminal. One of the transistors is connected to operate as a diode and the input or control current flows mainly through this diode and in part through the emitter-to-base junction of the other transistor. The mirror output current is available at the collector of this other transistor. In the species of current mirror in which the areas of the junctions of the two transistors are equal, the base-to-emitter voltage provided at the base electrodes of the transistor maintains the output current to be substantially equal in magnitude to the input or control current.

The degree of equality between the magnitudes of the control and output currents is directly proportional to the beta ($\beta$) or common-emitter current gain values of the pair of bipolar transistors. Wilson U.S. Pat. No. 3,588,672 discloses a means for reducing the $\beta$ dependence of the basic current mirror configuration, through the addition of a third bipolar transistor coupled between the collector electrodes of the pair of transistors of the basic current mirror. The Wilson current mirror is known in the art as a "super current mirror."

When bipolar transistors having a low value "current-gain-bandwidth product" ($f_T$) are used in the basic current mirror configuration, the high-frequency performance obtained is poor. The reason is the shunting effect of the distributed capacitances and the poor emitter efficiency inherent in the bipolar transistors. That is, as the frequency increases, more and more of the input current is by-passed to the common terminal through these capacitances rather than being amplified by the mirror. If such low $f_T$ bipolar transistors are included in a super current mirror configuration, the high-frequency performance is improved at the low end of the frequency band, in comparison to the basic current mirror configuration, but the bandwidth is only slightly extended. The problem of low $f_T$ is inherent in PNP bipolar transistors of the lateral type (because they have relatively low gain). This is much less a problem with NPN bipolar transistors of the vertical type, which normally exhibit much higher values of $f_T$.

The present inventor has discovered that the high-frequency response of a current mirror formed with bipolar transistors having a low $f_T$ may be greatly enhanced, and the bandwidth extended, by incorporating a field effect transistor FET in the circuit. The conduction path of the FET is placed in series with the output current path of the mirror and the control terminal coupled to the input terminal of the mirror. So connected, the effective source impedance of the PNP bipolar reduces with increasing frequency to reduce the degenerative effects of the PNP. Thus, the effective gain of the FET increases with frequency. In other words, as the frequency increases, the FET provides increasingly greater gain in response to the decreasing output impedance of the bipolar output transistor.

Figure 1C:
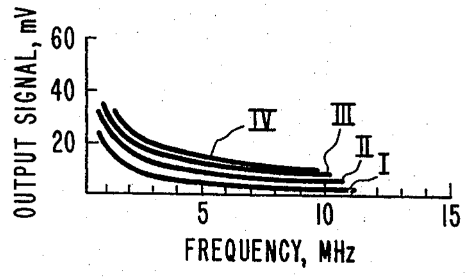
Figure 2A:
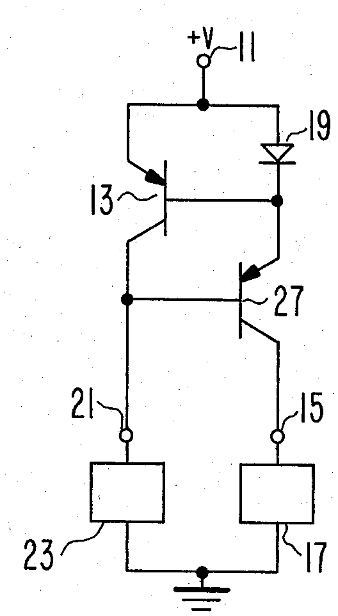
PRIOR ART FIG. 2a
Figure 2B:
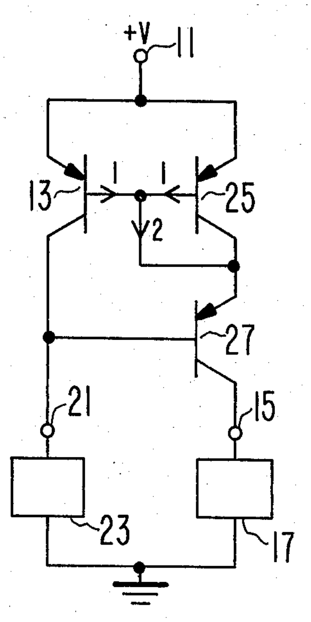
PRIOR ART FIG. 2b
Figure 2C:
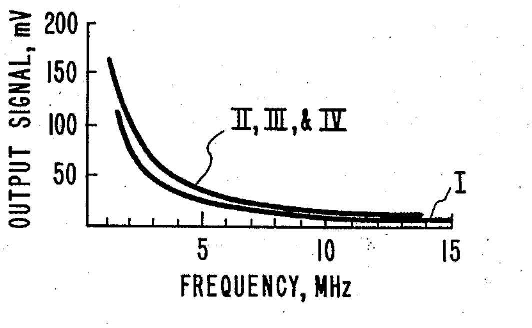

In the drawing described briefly below, like reference characters refer to like elements:

FIGS. 1*a* and *b*, are schematic drawings of two known current mirrors;

FIG. 1*c* shows frequency response curves for the circuits of FIGS. 1*a* and (*b*);

FIGS. 2*a* and *b* are schematic drawings of known super current mirrors;

FIG. 2*c* illustrates frequency response curves for the circuits of FIGS. 2*a* and *b;*

Figure 3A:
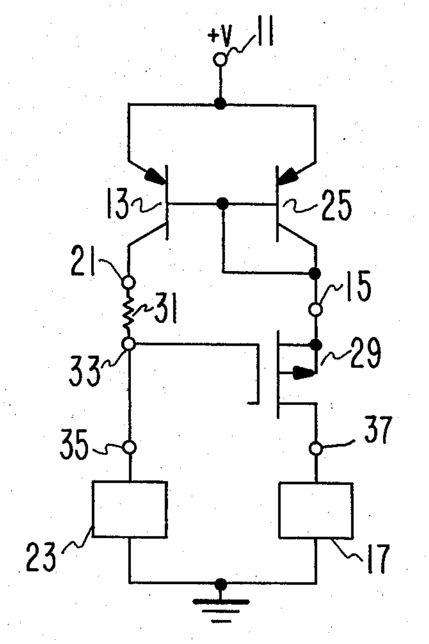
Figure 3B:
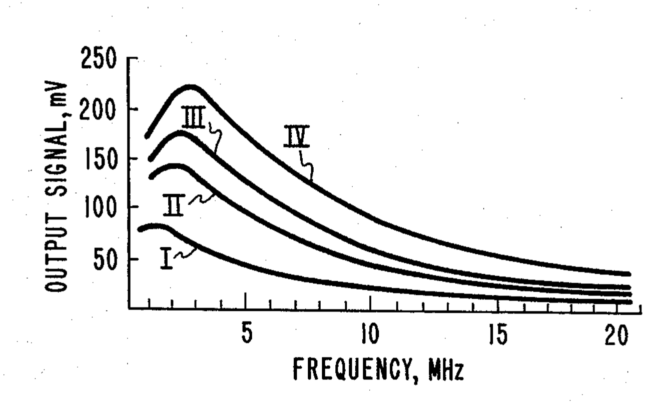
Figure 4A:
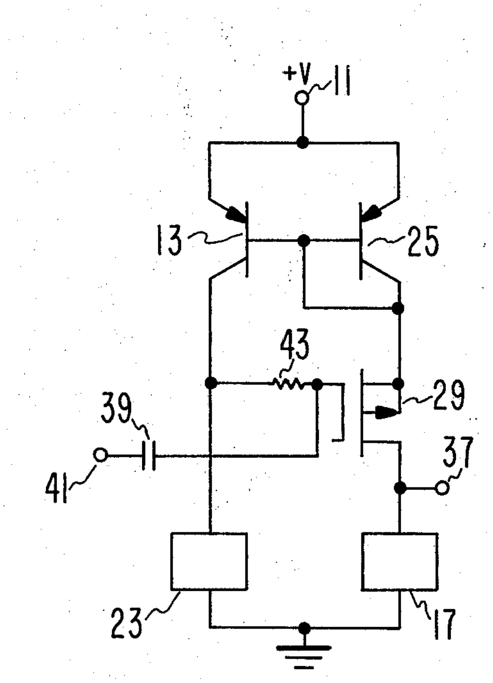

FIG. 3*a*, is a schematic diagram of one embodiment of the present invention;

FIG. 3*b* illustrates frequency response curves for the circuit of FIG. 3*a;* and FIGS. 4*a* and *b*, are schematic diagrams of embodiments of the present invention operated as degenerative FET amplifiers.

The basic current mirror of the prior art, as shown in FIG. 1*a*, includes a common terminal 11, an input terminal 21 and an output terminal 15. A voltage source +V may be connected to the common terminal 11 Bipolar transistor 13 is connected at its emitter electrode to terminal 11, and its collector electrode to terminal 15. Load 17 is connected between terminal 15 and a point of reference potential, ground in this example. Diode 19 is connected at its anode to common terminal 11, and at its cathode to the base electrode of transistor 13, and to input terminal 21. Current supply 23 is connected between the input terminal 21 and ground.

In operation, the control current flowing through diode 19 establishes a given voltage across the base-emitter junction of transistor 13. Assuming the area of the diode junction to be equal to that of the emitter-base junction of transistor 13, this voltage drop controls the emitter-to-collector conduction through transistor 13 to a level such that the output current available at output terminal 15 is substantially equal in magnitude to the input or control current at input terminal 21.

As is well understood in this art, the diode 19 of FIG. 1*a* may be implemented by a diode connected bipolar transistor 25, as shown in FIG. 1*b*. This transistor is connected base electrode-to-collector electrode and in the integrated circuit art, is a preferred form of diode for use in a current mirror. The reason is that it is relatively easy to match its parameters to those of transistor 13.

The output-to-input current ratio of the basic current mirror of FIG. 1*b*, can most readily be derived by assuming the condition where a unit of current exists at each one of the base electrodes of the transistors 13 and 25, and that the common emitter current gains ($\beta$) of transistors 13 and 25 are matched. Under these assumed conditions, the input or control current ($I_i$) flowing from input terminal 21 into the current supply 23 will have a magnitude of ($\beta+2$), and the output or load current flowing from output terminal 15 into the load 17 will have a magnitude of $\beta$. Therefore, the current ratio defined as $I_o/I_i$ follows:

$$\frac{I_o}{I_i} = \frac{\beta}{(\beta = 2)} \qquad (1)$$

From equation (1), it is obvious that the degree of equivalence between the output current and control current depends upon, and is directly proportional to, the magnitude of the current gains of transistors 13, 25. For example, if the $\beta$ values of transistors 13 and 25 were equal to 15, the current ratio would be 0.88. As $\beta$ increases, the ratio approaches 1.

As disclosed by Wilson U.S. Pat. No. 3,588,672, and as shown in FIG. 2*a*, *b*, the basic current mirror of FIG. 1 can be made less $\beta$ dependent by including a third bipolar transistor 27 in the current mirror circuit with the transistors 13, 25 of the basic current mirror circuit portion inversed. Transistor 27 is connected at its base electrode to the collector electrode of transistor 13 and at its emitter electrode to the cathode of diode 19. If the diode is a transistor connected as a diode, as shown in FIG. 2*b*, the emitter electrode of transistor 27 is connected to the common base collector connection of this diode. The collector electrode of transistor 27 is connected to the output terminal 15.

In the operation of the super current mirror of FIG. 2*b*, output current flows from the common terminal 11, through the emitter-to-collector path of transistor 25, the emitter-to-collector path of transistor 27, to output terminal 15, and from there through load 17 to ground.

This circuit tends to keep the output current $I_0$ more constant than the previous circuit. If $I_0$ (the collector current of transistor 27) tends to increase, the voltage across diode 25 tends to increase. The increase in voltage at the base of transistor 13 tends to decrease the emitter-to-collector impedance of this transistor and this reduces the voltage between the common terminal 11 and the base of transistor 27. This tends to reduce the output current $I_0$ flowing from the collector of transistor 27 to its initial value. This in turn restores the input current $I_i$ to its initial value. There is less dependence in this circuit on $\beta$ to maintain the $I_0/I_i$ ratio constant than in the previous circuit, as should be clear from this discussion and as is shown in a more quantitative way in the equations which follow: Let:

$I_{e13}$ be the emitter current of transistor 13;

$I_{e25}$ be the emitter current of transistor 25;

$I_{e27}$ be the emitter current of transistor 27;

$I_{c13}$ be the collector current of transistor 13;

$I_{c25}$ be the collector current of transistor 25;

$I_0$ be the output current from output terminal 15 or the collector current ($I_{c27}$) of transistor 27;

$I_i$ be the input current or control current flowing into current supply 23;

$I_{b27}$ be the base current of transistor 27;

$\beta_{13}$, $\beta_{25}$, $\beta_{27}$ be the common emitter current gains transistors 13, 25 and 27 respectively.

Assume that transistors 13, 25, and 27 are PNP bipolar transistors, as shown. Assume that a unit of base current is flowing out of each one of the base electrodes of transistors 13 and 25.

$$I_{e13} = \beta_{13} + 1 \quad (2)$$
$$I_{e25} = \beta_{25} + 1 \quad (3)$$
$$I_{e27} = \beta_{25} + 2 \quad (4)$$

$$I_{b27} = \frac{\beta_{25} + 2}{\beta_{27} + 1} \quad (5)$$

$$I_o = I_{c27} = I_{b27}\,(\beta_{27}) \quad (6)$$

Therefore:

$$I_o = \beta_{27} \left( \frac{\beta_{25} + 2}{\beta_{27} + 1} \right) \quad (7)$$

$$I_{c13} = \beta_{13} \quad (8)$$

Therefore:

$$I_i = \beta_{13} + I_{b27} \quad (9)$$

$$I_i = 13 + \left( \frac{\beta_{25} + 2}{\beta_{27} + 1} \right) \quad (10)$$

The current ratio is defined as:

$$\frac{I_o}{I_i}$$

Therefore:

$$\frac{I_o}{I_i} = \frac{\beta_{27} + \left( \frac{\beta_{25} + 2}{\beta_{27} + 1} \right)}{\beta_{13} + \left( \frac{\beta_{25} + 2}{\beta_{27} + 1} \right)} \quad (11)$$

(the numerator term is printed with a "1" beneath it)

$$\frac{I_o}{I_i} = \frac{\beta_{27}\,(\beta_{25} + 2)}{\beta_{13}\,(\beta_{27} + 1) + (\beta_{25} = 2)} \quad (12)$$

If the $\beta$ of each one of the transistors 13, 25, and 27 are matched, then:

$$\frac{I_o}{I_i} = \frac{\beta^2 + 2\beta}{\beta^2 + 2\beta + 2} \quad (13)$$

If $\beta$ is 15, for example, the value of the current ratio for the super current mirror will be 0.99, which is a substantial improvement over the basic current mirror of FIG. 1.

Summarizing from the analysis above, the super current mirror provides an output current that corresponds more substantially to the control or input current. Also, the super current mirror has greater gain than the basic mirror. However, as shown in FIG. 1*c* and FIG. 2*c*, the frequency response of both current mirrors falls off rapidly between 1 MHz and 10MHz.

The families of curves of FIGS. 1*c*, 2*c*, and 3*b*, represent sucessively higher output currents, (I) through (IV) representing output currents having magnitudes of 100$\mu$a, 500$\mu$a, 1ma, and 2ma respectively. The output signal is at peak value of the output current signal developed across load 17. The frequency response curves were obtained from mirror circuits using lateral PNP transistors of a RCA CA3084 general prupose PNP linear integrated circuit transistor array. As previously mentioned, lateral PNP transistors generally have low values of common emitter current-gain-bandwidth product ($f_T$), resulting in poor high frequency performance of such lateral PNP transistors. Contrarywise, vertical NPN transistors generally have high values of $f_T$, resulting in current mirrors of the basic and super current mirror configurations having good high frequency performance, where vertical NPN transistors are used in such circuits.

As the frequency of the input or control current increases, it has been shown that the gain of the basic and super current mirror circuits falls off rapidly. The reduction in gain with frequency of the mirror circuits is caused by the distributed capacitances of each one of the bipolar transistors 13, 25 and 27 (in the super mirror). As the frequency increases, the distributed capacitances increasingly shunt or bypass signal current between the collector and emitter electrodes of the bipolar transistors 13, 25, 27 deteriorating the high frequency gain of such transistors. For this reason, the $f_T$ of lateral PNP transistors is low. Also, the impedance looking into the collector electrodes of each one of the bipolar transistors 13, 25, 27 decreases with increasing frequency, as a result of the capacitive by-passing effect.

The present inventor has discovered that the high frequency performance of the lateral PNP transistor basic current mirror configuration can be greatly improved through the addition of a field effect transistor (FET) such as one of the metal oxide semiconductor (MOS) type to the basic current mirror circuit, as shown in FIG. 3. This same technique may also be used with NPN transistor current mirrors, where the NPN transistors happen to have low values of $f_T$, and improved frequency response is desired.

In the circuit shown in FIG. 3, a PMOS transistor 29 is connected at its source electrode to terminal 15, at the base-collector connection of transistor 25, and at its drain electrode to terminal 37 of load 17. A resistor 31 is connected at one terminal 21 to the collector of transistor 13 and at its other terminal 33 to the gate electrode of transistor 29. In other respects, the circuit is similar to the FIG. 2 circuit.

FIG. 3*b* illustrates the improved frequency response of the hybrid current mirror of the present invention, for the family of output current magnitudes I through IV. The bandwidth or useable response of the hybrid current mirror is more than twice that of the super current mirror configuration, if one considers 50mV as the smallest useful amplitude.

The hybrid current mirror has a substantially improved frequency response, in comparison to the basic and super current mirror configurations, as a result of the greater gain-bandwidth-product ($f_T$) introduced by PMOS transistor 29. PMOS transistors generally have a much greater $f_T$ than lateral PNP transistors. Accordingly, PMOS transistor 29 in combination with source impedance 25 tends to counteract the deterioration in gain, with increasing frequency, of lateral PNP transistors 13 and 25, by providing extended high-frequency gain.

Resistor 31 enhances the high-frequency response of the hybrid current mirror by providing decoupling of the distributed capacitance of the PNP transistors 13 and 25, from the gate electrode of the PMOS transistor 29. Resistor 31 provides such decoupling by ensuring that the impedance between the gate electrode of PMOS transistor 29 and the common terminal 11 is never less than the resistance value of resistor 31. In this manner, resistor 31 prevents the distributed capacitance from by-passing the control or input signal away from the gate of the PMOS transistor 29 at high frequencies.

Although not fully understood, the peaking phenomena, at about 2½ MHz, of the frequency response curves of the hybrid mirror circuit [FIG. 31] is apparently caused by the effect of the distributed capacitances of lateral PNP transistors 13 and 25. As the frequency increases from below 1 MHz to about 2½ MHz, the gain of the lateral PNP transistors 13, 25 is increasingly additive to the gain of PMOS transistor 29, whereby the overall gain of the hybrid mirror circuit is actually increasing toward a peak value. When the peak gain is reached at about 2½ MHz, the gain of transistors 13 and 25 begins to deteriorate, due to the shunting or by-passing effect of their distributed capacitances. Accordingly, the overall gain of the hybrid mirror circuit begins to decrease at frequencies above 2½ MHz to 3 MHz.

The current ratio for the hybrid or improved current mirror can readily be obtained by using the current ratio equation (12). Assuming transistors 13 and 25 to have matched current $\beta$ gains, equation (12) reduces to:

$$\frac{I_o}{I_i} = \frac{\beta_{27}(\beta + 2)}{[\beta(\beta_{27} + 1) + (\beta + 2)]} , \qquad (14)$$

where $\beta$ is the current gain of transistors 13 and 25. With transistor 27 of FIG. 2 assumed to be a FET (as it is in FIG. 3), then one may assume that $\beta_{27}$ will approach infinity. Therefore, if one takes the limit of equation 14 as $\beta_{27}$ approaches infinity, the current ratio for the hybrid basic current mirror of the present invention is obtained. The ratio is:

$$\frac{I_o}{I_i} = \lim_{\beta_{27} \to \infty} \left[ \frac{(\beta + 2)\,\beta_{27}}{\beta(\beta_{27}) + 2\beta + 2} \right] \qquad (15)$$

which reduces to:

$$\frac{I_o}{I_i} = \frac{\beta + 2}{\beta} \qquad (16)$$

Since the diode connected transistor 25 is in the output circuit, and transistor 13 is in the input of the control circuit of the hybrid current mirror, the current ratio shown in equation (16) is the inverse of that for the basic current mirror configuration shown in FIG. 1*b*, where the transistors 13 and 25 are oppositely located in comparison with the hybrid circuit. Therefore, if for example, the $\beta$ values of transistors 13 and 25 are each 15, the current ratio of the improved or hybrid current mirror is 1.133.

As shown from equations (1), (15), and (16), the current ratios of the hybrid mirror circuit is substantially more $\beta$ dependent than the current ratio of the super current mirror circuit. However, the advantage achieved at the price of this $\beta$ dependency, far outweighs this penalty in many important applications. For example, in those high-frequency applications, where high gain over an extended bandwidth is required, the hybrid mirror circuit provides the required performance — performance not available with the previous mirrors described.

As previously described, and as shown in FIG. 4*a*, the hybrid or improved basic current mirror has application as a degenerative FET amplifier, wherein a capacitor 39 is used to couple an input signal from an input terminal 41 to the gate electrode of the FET transistor 29. The decoupling resistor 31 of the hybrid configuration has been eliminated in the amplifier application, and replaced by another decoupling resistor 43, connected between the gate electrode of FET transistor 29 and the collector of transistor 13, as shown. In this manner, resistor 43 provides decoupling of the distributed capacitance of transistor 13 from both FET 29 and the signal source connected to the signal input terminal 41. Resistor 43 insures that the gate electrode of FET 29 and the signal source are never directly shunted to common terminal 11 at high frequencies. The current supply 23 and load 17 can be fixed resistors. The resistance values of the fixed resistances 23 and 17 are determined by the desired quiescent operating point for the FET 29.

Operation of the hybrid current mirror as a degenerative FET amplifier is provided by the diode connected bipolar transistor 25 serving as a source impedance for PMOS transistor 29. As the frequency increases, the source impedance provided by transistor 25 decreases or degenerates, due to the shunting effect of its distributed capacitance with increasing frequency. This decreasing source impedance with increasing frequency causes an increased current to flow into the source electrode of FET 29, which in turn causes the magnitude of the output current to be substantially maintained.

The voltage gain of this amplifier is $g_m$ $R_L$, where $g_m$ (transconductance) is established by the intrinsic $g_m$ of the FET 29 at the operating current set by current supply 23. $R_L$ is the load 17, which may be a resistor or an impedance. Therefore, by varying the operating current established by current supply 23, the effective gain may be varied.

Figure 4B:
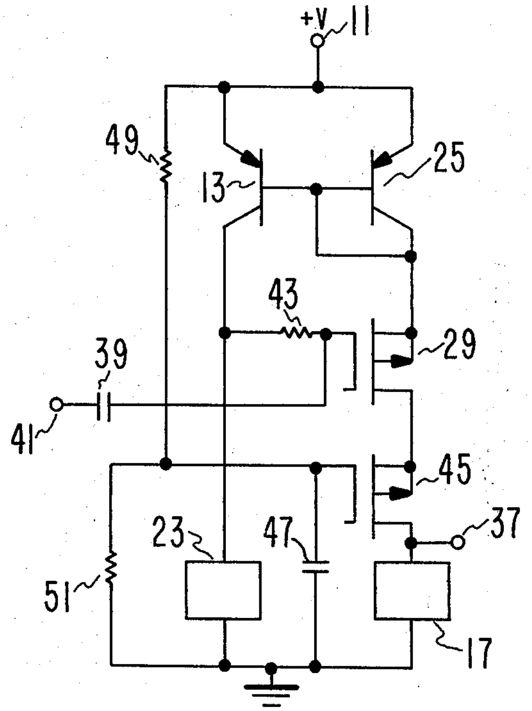

With reference to FIG. 4*b*, the operation of the degenerative FET amplifier can be improved through the addition of a second FET 45, cascoded with FET 29. FET 45 is connected at its source electrode to the drain electrode of FET 29, and at its drain electrode to output terminal 37 and load 17. The gate electrode of FET 29 is connected to ac-bypass capacitor 47, and to the resistive divider network formed by the resistors 49 and 51. Resistors 49 and 51, connected in series between the power input terminal 11 and ground, provide a quiescent bias voltage, at their common connection point, for FET 45. FET 45 operates to improve the performance of the degenerative FET amplifier by cascoding, which greatly reduces the effective feedback cpacitance and also provides a very high output impedance for the amplifier. In other words, FET transistor 45 substantially isolates the output signal from the input circuit of the first FET 29. Capacitor 47, connected between the gate electrode of FET 45 and ground, provides an R.F. bypass, as is well known in the art. The current supply 23, can be made a variable supply to vary the operation point and gain of the amplifier, for each one of the amplifier circuits of FIGS. 4*a* and 4*b*.

What is claimed is:

1. In combination:

a current mirror including an input terminal, an output terminal, a common terminal, and bipolar transistors, said bipolar transistors of said current mirror having distributed capacitance between base and emitter electrodes which tends to deteriorate the high-frequency performance of said transistor;

means for counteracting said tendency comprising a field effect transistor having a source electrode connected to the output terminal of said current mirror, a gate electrode coupled to the input terminal of said current mirror, and a drain electrode;

a current supply connected between the input terminal of said current mirror and a point of reference potential; and a load connected between said drain electrode and said point of reference potential.

2. The combination of claim 1, wherein an input terminal receptive of an input signal is coupled to the gate electrode of said field effect transistor to provide a degenerative field effect transistor amplifier.

3. The combination of claim 1, wherein said current mirror and said field effect transistor are fabricated as an integrated circuit.

4. The combination of claim 1, wherein a resistor is used to couple the gate electrode of said field effect transistor and a terminal of the current supply to the input terminal of said current mirror, said resistor providing decoupling of the interelectrode capacitance of said bipolar transistors from said field effect transistor and current supply, enhancing the high-frequency performance of said combination.

5. The combination of claim 1, wherein said field effect transistor is a metal-oxide-semiconductor field effect transistor.

6. In combination:

a first bipolar transistor connected at its emitter to a common terminal, and at its collector to an input terminal;

diode means connected at one electrode to said common terminal, and at its other electrode to both an output terminal and a base electrode of said bipolar transistor;

a current supply coupled between the input terminal of said bipolar transistor and a point of reference voltage;

said bipolar transistor having distributed capacitance between its electrodes, said diode having distributed capacitance between its electrodes, the capacitances of said diode and transistor tending to reduce the high-frequency gain of said combination of said bipolar transistor and diode means;

load means connected at one terminal to said point of reference voltage; and a field effect transistor having a source electrode connected to said output terminal, a gate electrode coupled to the input terminal of said first bipolar transistor, and a drain electrode connected to the other terminal of said load means, for counteracting said reduction in high-frequency gain, and for providing greater gain with extended frequency response.

7. The combination of claim 6, wherein said diode means includes a diode connected second bipolar transistor having an emitter electrode connected to said common terminal, a base electrode and a collector electrode connected in common to said output terminal and to the base electrode of said first bipolar transistor.

8. The combination of claim 6, wherein said first bipolar transistor, diode means, and field effect transistor are fabricated as an integrated circuit.

9. The combination of claim 6, which further includes a signal input terminal receptive of an input signal, coupled to the gate electrode of said field effect transistor, for providing a degenerative field effect transistor amplifier.

10. The combination of claim 6, which further includes a resistor connected at its one end to said input terminal, and at its other end to said current supply and the gate electrode of said field effect transistor, said resistor providing decoupling of said distributed capacitance of said bipolar transistor from said current supply and field effect transistor, improving the high-frequency performance of said combination.

11. The combination of claim 6, wherein said field effect transistor is a metal-oxide-semiconductor field effect transistor.

12. A degenerative field effect transistor amplifier comprising:

a first field effect transistor having gate, source, and drain electrodes, said drain electrode being connected to an output terminal, said gate electrode being coupled to an input terminal receptive of an input signal; and current mirror means coupled between the gate and source electrodes of said field effect transistor for degeneratively lowering the source impedance of said field effect transistor to substantially maintain the magnitude of the output current from said amplifier as the frequency of the input signal increases, and for establishing the quiescent operating point of said field effect transistor.

13. The degenerative field effect transistor amplifier of claim 12, wherein said current mirror means includes:

semiconductor unidirectional current means through which a substantial portion of an output current flows for establishing a first control voltage, said unidirectional current means being coupled between a common terminal and the source electrode of said field effect transistor;

bipolar transistor means through which a substantial portion of a control current flows for establishing a second control voltage at the gate electrode of said field effect transistor, said bipolar transistor means having a main current carrying path coupled between said common terminal and the gate electrode of said field effect transistor, and having a control terminal receptive of said first control voltage; and impedance means for establishing the magnitude of said control current, said impedance means being connected between the gate electrode of said field effect transistor and a point of reference voltage.

14. The degenerative field effect transistor amplifier of claim 13, wherein said semiconductor unidirectional current means includes a bipolar transistor that is diode connected, said bipolar transistor having an emitter electrode connected to said common terminal, a base electrode commonly connected to a collector electrode, to the control terminal of said bipolar transistor means, and to the source electrode of said field effect transistor.

15. The degenerative field effect transistor amplifier of claim 13, wherein said semiconductor unidirectional current means includes a diode having one electrode into which said output current flows, and another electrode from which said output current flows.

16. The degenerative field effect transistor amplifier of claim 13, wherein said bipolar transistor means includes a bipolar transistor having an emitter electrode connected to said common terminal, a base electrode connected as said control terminal and to the source electrode of said field effect transistor, and a collector electrode coupled to the gate electrode of said field effect transistor.

17. The degenerative field effect transistor amplifier of claim 12, wherein said field effect transistor and said current mirrow means are fabricated as an integrated circuit.

18. The degenerative field effect transistor amplifier of claim 16, wherein a resistor is connected from the gate electrode of said field effect transistor to both said impedance means and the collector electrode of said bipolar transistor, said resistor providing decoupling of interelectrode capacitances of said bipolar transistor from said field effect transistor, to improve the high-frequency response of said amplifier.

19. The degenerative field effect transistor amplifier of claim 12, which further includes:

field effect transistor means cascoded with said first field effect transistor for providing a very high output impedance, and for reducing the effective feedback capacitance.

20. The degenerative field effect transistor amplifier of claim 19, wherein said field effect transistor means includes:

a second field effect transistor having a source electrode connected to the output terminal of said first field effect transistor, a drain electrode connected to a load, and a gate electrode; and resistive voltage divider network means connected between said power input terminal and said point of reference voltage for biasing the gate electrode of said second field effect transistor.

21. The degenerative amplifier of claim 20, wherein said first and second field effect transistors are each a metal-oxide-semiconductor field effect transistor.

22. The combination of:

an input terminal, an output terminal, and a common terminal;

a bipolar transistor having base, emitter, and collector electrodes, connected at its emitter electrode to said common terminal;

first resistor means, said first resistor means connecting said collector electrode to said input terminal;

a diode connected between said common terminal and the base electrode of said transistor, in the forward direction relative to the emitter-base junction of said transistor; and a first field effect transistor having a conduction path and a control electrode, said conduction path being connected between said base electrode and said output terminal, and said control electrode being coupled to said input terminal.

23. The combination of claim 22, further including: seconds resistor means, said second resistor means coupling said control electrode to said input terminal; and a signal input terminal at the connection between said resistor means and said control electrode.

24. The combination of claim 23, further including:

a second field effect transistor having a conduction path and a control electrode, said conduction path being connected in series with and between the conduction path of said first field effect transistor and said output terminal; and a pair of resistors connected in series as a resistive voltage divider between said common terminal and a point of reference potential, the common connection point between said pair of resistors being connected to the control electrode of and for biasing said second field effect transistor.

* * * * *

UNITED STATES PATENT OFFICE
CERTIFICATE OF CORRECTION

PATENT NO. : 3,925,718

DATED : December 9, 1975

INVENTOR(S) : Harold Allen Wittlinger

It is certified that error appears in the above-identified patent and that said Letters Patent are hereby corrected as shown below:

On the title sheet, the filing date should read --November 22, 1974--.

Column 2, equation (1) should read as follows:

$$\frac{I_o}{I_i} = \frac{\beta}{(\beta+2)} .$$

Column 4, equation (11) should read as follows:

$$\frac{I_o}{I_i} = \frac{\beta_{27}\left(\frac{\beta_{25}+2}{\beta_{27}+1}\right)}{\beta_{13} + \left(\frac{\beta_{25}+2}{\beta_{27}+1}\right)}$$

Also, equation (12) should read as follows:

$$\frac{I_o}{I_i} = \frac{\beta_{27}(\beta_{25}+2)}{\beta_{13}(\beta_{27}+1)+(\beta_{25}+2)}$$

Column 5, line 64, that portion reading "[FIG. 31]" should read --[FIG. 3b]--. Column 6, equation (15) should read as follows:

$$\frac{I_o}{I_i} = \operatorname{Lim}_{\beta_{27}\to\infty} \left[\frac{(\beta+2)\ \beta_{27}}{\beta\ \beta_{27} + 2\beta+2}\right]$$

Column 10, line 1, that portion reading "mirrow" should read --mirror--; line 50, that portion reading "seconds" should read --second--.

Signed and Sealed this

*thirteenth* Day of *April 1976*

[SEAL]

*Attest:*

RUTH C. MASON
*Attesting Officer*

C. MARSHALL DANN
*Commissioner of Patents and Trademarks*